June 30, 1942.   H. C. BOSTWICK   2,288,263
VULCANIZER PACKING
Filed April 3, 1940
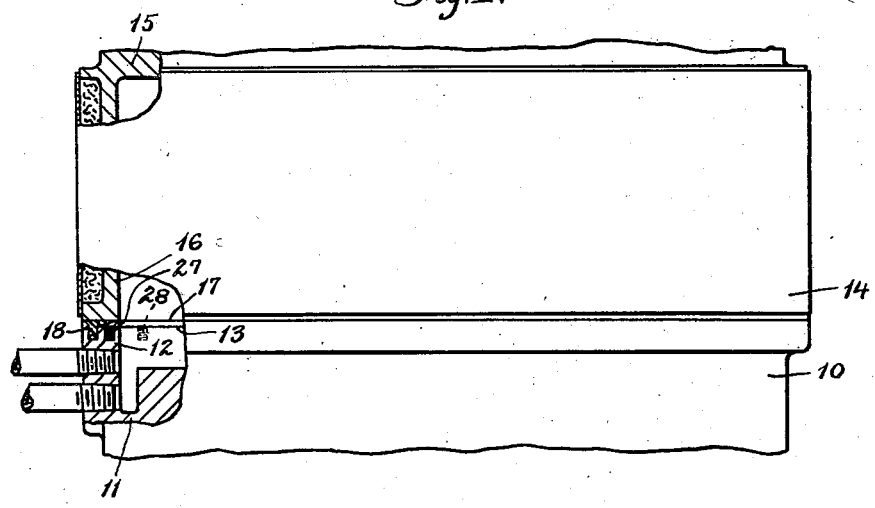
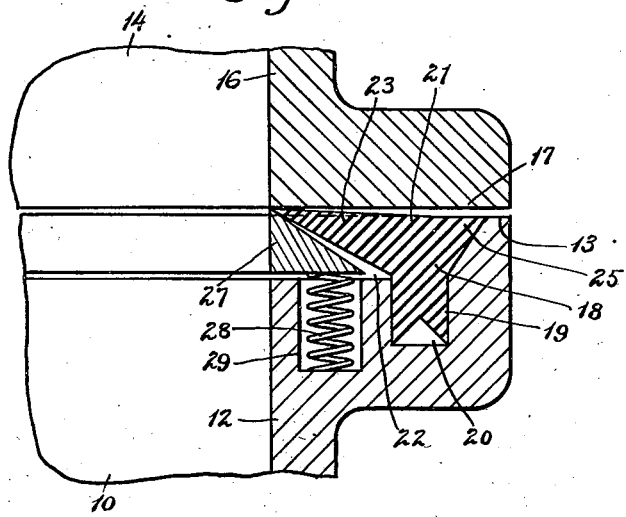
Inventor
H. C. Bostwick,
By Robert M. Pierson,
Attorney Patented June 30, 1942

2,288,263

UNITED STATES PATENT OFFICE 2,288,263

VULCANIZER PACKING

Henry C. Bostwick, Coventry Township, Summit County, Ohio, assignor to The Akron Standard Mold Company, Akron, Ohio, a corporation of Ohio Application April 3, 1940, Serial No. 327,649

4 Claims. (Cl. 18—7)

This invention relates to annular packings for sealing a butt joint between parts such as the casing body and cover of a vulcanizer or analogous device, to retain the fluid-pressure heating medium such as steam and, if desired, to exclude the outside atmosphere when a negative pressure or vacuum is applied.

The principal object in view is to provide an improved flexible lip-packing gasket and associated structure adapted effectively to seal a butt joint when the members have initially made contact and are nearly but not fully closed, with the steam turned on, so as to avoid an objectionable escape of steam into the room under such conditions. A further object is to enable the same flexible gasket to be employed for sealing against both positive and negative fluid pressures.

This application is a continuation, in part, of my application for Individual mold vulcanizer, Ser. No. 248,959, filed Jan. 3, 1939.

Of the accompanying drawing views, Fig. 1 is a side elevation, partly broken away and in section, showing a portion of a vulcanizer provided with packing means in accordance with my present invention.

Fig. 2 is an enlarged detail section showing the packing and associated structure.

In the drawing, 10 is the fixed lower casing part or member of a vulcanizer, in the form of a shallow, cup-shaped, upwardly-open receptacle including a floor 11 and an annular upstanding side wall 12, the latter having a marginal flat upper surface 13 in a normal plane. 14 is a complemental movable upper casing part, lid or cover having a roof wall 15 and an annular depending side wall 16 provided with a flat lower marginal seat 17 in a normal plane, adapted to abut a packing inset in the marginal surface 13 of the lower casing member when the members are in closed relation. These casing parts may, for example, constitute the lower and upper press platens of an individual toggle press for molding and vulcanizing rubber articles, such as pneumatic tires, wherein the lower and upper mold members are attached respectively to the floor and roof (or an adjustable roof plate) of the casing parts 10 and 14, as in my aforesaid application Ser. No. 248,959, or they may be members of any other pot or analogous vulcanizer or other suitable receptacle.

In the joint face of one of the casing parts, in this case the lower one, is mounted an annular packing gasket 18 made of soft vulcanized rubber or rubber-like material, having an annular stem portion 19 of fishtail section, which is mounted in an annular channel 20 formed in the wall 12 of the casing part 10, and a sealing body 21 of double wedge-shaped or tapering section occupying an annular recess 22 in the casing wall, communicating with the channel 20. The gasket body includes an inwardly-projecting tapered lip 23 for sealing against a positive steam pressure which may be established in the casing through a supply pipe 24 connected with the lower casing part 10, and an outwardly-projecting tapered lip 25, having a common upper surface with the lip 23, for sealing against the atmosphere when a negative pressure or vacuum is established in the chamber through another pipe 26 connected with said lower casing part.

27 is a metallic presser or backing ring of wedge-shaped section reverse to that of the lip 23, occupying the inner part of the recess 22 under said lip, and yieldingly urged in an upward direction against the toe of the lip 23 by a circumferential series of helical springs 28 mounted in sockets 29 in the wall 12.

In the operation of my invention, after locating the work in the vulcanizer, the movable upper lid or casing part 14 is brought down upon the fixed lower casing part 10 by the motive mechanism of the press, and when the parts have reached substantially the nearly closed relation illustrated in Fig. 2, the packing is ready to function. If a vacuum is first applied through the pipe 26 to the casing chamber to aid in exhausting air from the interior of the mold (not shown), the outside atmospheric pressure acting on the outer packing lip 25 will force said lip upwardly against the marginal joint face 17 of the cover wall 16 to seal said chamber and allow the vacuum to be maintained. On relieving the vacuum and turning steam into the chamber through pipe 24 for curing the rubber article in the mold, the yieldingly-mounted rigid metal ring 27 holds the toe of the inner packing lip 23 up against said joint face 17 so as to insure an initial sealing between the gasket 18 and said joint face, even though the casing parts 10 and 14 are not otherwise mechanically closed tight against each other. Hence the steam pressure, acting on the back or lower side of the lip 23, can perfect the sealing by fluid pressure, in addition to the mechanical clamping pressure furnished by the power press, so that no objectionable amount of steam will escape into the room while the mold and casing members are being brought tightly together. Steam pressure reaching the bottom of the channel 20 tends to seal the annular gasket stem 19 by pressing the lips of the fishtail edge of said stem against the parallel sides of the channel.

The described embodiment could be variously modified within the scope of my invention as defined in the claims.

I claim:

1. A gasket for a pair of coacting butt-sealing members adapted to be carried by one of the members and bear against the other, said gasket having an annular substantially flat bearing face and having an annular stem, said stem being bounded by concentric cylindrical surfaces, and inward and outward flexible annular lips extending from said face to said stem, said lips being bounded by conical surfaces leading from the edge of the annular face to the respective cylindrical surfaces of the stem, whereby said gasket by reason of its stem may be seated and held in a groove in one of the members to be sealed while having inward and outward annular lips bearing against the other member.

2. Vulcanizer apparatus comprising separable casing parts having butt-seal marginal faces, an annular flexible rubber gasket having a stem portion seated in a groove in one of said margins, and having an inwardly extending sealing lip tapered toward the engaging face of the gasket, an oppositely-tapering metal ring of triangular section backing said lip, and spring means for yieldingly projecting the backing ring, said groove forming an annular channel and said stem having a pair of fish-tail sealing lips.

3. Vulcanizer apparatus comprising separable casing parts forming a heating chamber and having respective butt-seal annular joint-forming margins, a flexible lip-packing gasket mounted in one of said margins for butt-sealing against the opposite margin, said gasket having an annular stem portion seated in an annular groove in said margin and having an annular lip portion adapted to bear at its outer face against the opposite margin, the inner face of said lip portion being inclined from the peripheral edge toward the stem in the direction away from the outer face, a tapered backing ring out of engagement with the stem and having an inclined outer face bearing against the inclined face of the lip near its periphery, and a spring bearing against the backing ring to press it against the lip without acting on the stem.

4. A packing structure comprising two members having abutting faces, a gasket carried by one of the members and adapted to abut the other, said gasket having on one side an intermediately located annular stem seating in a recess in the member which carries the gasket, the gasket having beyond the stem an inwardly extending annular lip and an outwardly extending annular lip, the said annular lips being inclined on their under faces from the stem respectively toward the inner and outer periphery of the abutting face of such gasket, a ring inclined on its upper face and lying beneath the inwardly extending lip and springs mounted in recesses in the member carrying gasket, which springs act on said ring to force the inwardly extending lip against the other member.

HENRY C. BOSTWICK.